United States Patent
Secretin

(10) Patent No.: US 12,256,475 B2
(45) Date of Patent: Mar. 18, 2025

(54) LUMINAIRE NETWORK MANAGEMENT METHOD

(71) Applicant: SCHREDER S.A., Brussels (BE)

(72) Inventor: Laurent Secretin, Liège (BE)

(73) Assignee: Schreder S.A., Brussels (BE)

( * ) Notice: Subject to any disclaimer, the term of this patent is extended or adjusted under 35 U.S.C. 154(b) by 29 days.

(21) Appl. No.: 18/002,387

(22) PCT Filed: Jun. 18, 2021

(86) PCT No.: PCT/EP2021/066693
§ 371 (c)(1),
(2) Date: Dec. 19, 2022

(87) PCT Pub. No.: WO2021/255277
PCT Pub. Date: Dec. 23, 2021

(65) Prior Publication Data
US 2023/0232519 A1 Jul. 20, 2023

(30) Foreign Application Priority Data
Jun. 18, 2020 (NL) ..................................... 2025858

(51) Int. Cl.
*H05B 47/155* (2020.01)
*H05B 47/105* (2020.01)
*H05B 47/19* (2020.01)

(52) U.S. Cl.
CPC ......... *H05B 47/155* (2020.01); *H05B 47/105* (2020.01); *H05B 47/19* (2020.01)

(58) Field of Classification Search
CPC .................................................. H05B 47/155
(Continued)

(56) References Cited

U.S. PATENT DOCUMENTS

| 2012/0310703 A1* | 12/2012 | Cavalcanti ............. H04W 4/38 705/7.29 |
| 2019/0104595 A1 | 4/2019 | Rosen et al. |
| 2020/0146132 A1 | 5/2020 | Chen et al. |

FOREIGN PATENT DOCUMENTS

| WO | 2010079388 A1 | 7/2010 |
| WO | 2015104603 A2 | 7/2015 |
| WO | 2018158356 A1 | 9/2018 |

OTHER PUBLICATIONS

PCT International Search Report and Written Opinion, Application No. PCT/EP2021/066693, mailed Aug. 25, 2021, 18 pages.

\* cited by examiner

*Primary Examiner* — Joseph Chang
(74) *Attorney, Agent, or Firm* — McDonnell Boehnen Hulbert & Berghoff LLP

(57) ABSTRACT

Example embodiments relate to luminaire network management methods. One embodiment includes a method of performing management in a luminaire network that includes a plurality of luminaires and a control system. Each luminaire of the plurality of luminaires is configured to operate in accordance with at least one profile which defines one or more settings of the luminaire in function of time. The method includes retrieving, by the control system, a position of one or more luminaires of the plurality of luminaires from a luminaire network database. The method also includes, based on the retrieved position, selecting, by the control system, an infrastructure use and/or feature from an infrastructure database. The infrastructure database stores a plurality of different infrastructure uses and/or features. Additionally, the method includes determining, by the control system for each of the one or more luminaires, at least one profile based on the selected infrastructure use and/or feature.

21 Claims, 3 Drawing Sheets

(58) Field of Classification Search
USPC .......................................................... 307/157
See application file for complete search history.

LUMINAIRE NETWORK MANAGEMENT METHOD

CROSS-REFERENCE TO RELATED APPLICATIONS

The present application is a national stage entry of PCT/EP2021/066693 filed Jun. 18, 2021, which claims priority to NL 2025858 filed Jun. 18, 2020, the contents of each of which are hereby incorporated by reference.

FIELD OF INVENTION

The field of the invention relates to methods of management of a luminaire network, preferably for lighting management, in particular for an outdoor luminaire network (OLN). Particular embodiments relate to an infrastructure dependent management method. The invention also relates to a computer program for performing such methods, a control system for a luminaire network, and a luminaire network.

BACKGROUND

Luminaire network management methods are commonly used on a large scale. Luminaires part of the network are usually installed neighboring a pathway, e.g. a street, a motorway, a bicycle lane, and are controlled to illuminate satisfyingly the neighboring pathway. Considering the illumination from a luminaire for example, depending on some characteristics of the pathway, e.g. number of lanes, density of traffic, type of pathway users, the luminaire has to satisfy some lighting standards, e.g. a public road lighting standard, or recommendations, such as EN 13201, IES RP-8, CIE 115; thereby allowing for an illumination giving a visibility above a predetermined level for users of the pathway, as well as giving a predetermined illumination safety, e.g. illumination intensity below a blinding intensity, light emitted within a certain arc to avoid glaring angles. The control and management of the luminaires part of the luminaire network are thus following these lighting standards.

Management of an outdoor lighting network (OLN) may be remotely managed to control the lighting behaviour (e.g. scheduling of the on/off times of the luminaires and/or setting dimming levels of the lighting units) and/or to monitor luminaire characteristics (e.g. light source status, energy consumption, luminaire specifications, etc.). Management of outdoor lighting networks may provide one or more benefits to customers (e.g. municipalities) such as increased security, energy savings, reduced maintenance costs, and reduced lighting pollution, etc.

One or more luminaires of an outdoor luminaire network typically comprises an outdoor lighting controller (OLC) capable of managing one or more luminaires by means of communication protocols. The OLCs may form a large network in which the communication links are based e.g. on IEEE 802.15.4 or on a LoRa wireless data communication technology. The network may be managed from the back-end by means of a plurality of segment controllers connecting the networks with the Internet. In such a solution an OLC includes a central processing unit (CPU) and a communication interface. In addition or alternatively, the OLC itself may be capable of communicating directly with the Internet.

However, the illumination management of luminaires is currently lacking since it is typically achieved according only to a lighting standard corresponding to a pathway neighboring the luminaire, which is an idealized situation where luminaires and pathways are considered in isolation from the rest of the surrounding environment. There is thus a need to have a management method whose approach considers as well the actual implantation of the luminaire in its environment. With the dawn of smart luminaires, such an approach is also needed for other managed functional units of the luminaires.

SUMMARY

The object of embodiments of the invention is to provide a method and system of performing management in a luminaire network so that performances and functionalities of luminaires part of a luminaire network are more closely tailored to the reality of the field.

According to a first aspect, there is provided a method of performing management in a luminaire network comprising a plurality of luminaires and a control system, each luminaire of said plurality of luminaires being configured to operate in accordance with at least one profile which defines one or more settings of the luminaire in function of time. The method comprises performing by said control system the steps of: retrieving a position of one or more luminaires of the plurality of luminaires from a luminaire network database; based on the retrieved position, selecting an infrastructure use and/or feature from an infrastructure database, said infrastructure database storing a plurality of different infrastructure uses and/or features; determining, for each of the one or more luminaires, at least one profile based on the selected infrastructure use and/or feature.

A typical pathway, especially in an urban environment, is bordered by a series of infrastructures, such as public buildings, transportation stops, parks, etc., and has its course interrupted by infrastructures as well, such as speed bumps, low speed areas, junctions, roundabouts, etc. Depending on some characteristics of the pathway, e.g. number of lanes, density of traffic, type of pathway users, a luminaire neighboring said pathway has to satisfy some lighting rules, such as standards, e.g. a public road lighting standard, or recommendations, such as EN 13201, IES RP-8, CIE 115. The infrastructures uses and/or features as cited above are not properly taken into account though.

Luminaires positions can be retrieved from a luminaire network database. The infrastructures composing the landscape surrounding the plurality of luminaires may also be retrieved and the infrastructures uses and/or features selected. The infrastructures uses and/or features may comprise an indication of position and/or an indication of time. For example, geographical positions of the infrastructures may be stored in the infrastructure database. In an embodiment, the infrastructures uses and/or features may indicate that the traffic will be dense in a certain area during a rush hour period due to the presence of a speed bump or a roundabout. In another embodiment, the infrastructures uses and/or features may indicate that a school is neighboring the street and running children are to be expected at the start and end of the school day. In yet another embodiment, the infrastructures uses and/or features may indicate that it is a street only for residential use with a low traffic density during the midst of the night. In still another embodiment, the infrastructures uses and/or features may indicate that there is a bus stop installed with a regular passage of buses following a given schedule.

By coordinating the luminaires positions, and the infrastructures uses and/or features, at least one profile may be determined for a corresponding luminaire to increase the overall performances and functionalities of the concerned luminaires. Thus, the luminaires are better tailored to their local reality, so they can be more effective in the zone part of their individual functional coverage. In an embodiment with a luminaire neighboring a risk prone area due to high traffic density during rush hour caused by a roundabout, a profile of an image-capturing device of the luminaire may be determined to increase, during the rush hour, the image capturing rate. In another embodiment with a luminaire neighboring a school, a profile of a lighting of the luminaire may be determined to increase the light intensity at the start and end of the school day in winter. In yet another embodiment with a luminaire located in a residential area, a profile of a speaker of the luminaire may be determined to be capped at a specific sound level during the wee hours of the night. In still another embodiment with a luminaire located next to a bus stop, a profile of a lighting of the luminaire may be coordinated with the passage schedule of buses.

Note that a plurality of infrastructure uses and/or features may be selected for a single luminaire and that a corresponding plurality of profiles may be determined for said luminaire. Additionally, the plurality of profiles may be a plurality of lighting profiles with time overlaps, and, for safety reasons, a profile with the light intensity maxima among the plurality of profiles may be determined. Alternatively or additionally, the plurality of lighting profiles with time overlaps may be associated with priority ranks, and a profile with the highest priority rank among the plurality of lighting profiles may be determined.

Although it is known to determine a lighting profile in function of time based on a type of a pathway, taking into account the infrastructures uses and/or features as described above has not been done before, and allows better efficiency and practicality. It is noted that the infrastructure uses and/or features selected from the infrastructure database may be a plurality of infrastructure uses and/or features for each luminaire of the plurality of luminaires. These infrastructure uses and/or features selected may serve in determining one or more profiles for one or more functional units of the luminaire. Such an accurate management may allow providing an environment with improved security whilst at the same time minimizing energy consumption by adjusting the at least one profile in accordance with the needs.

It is noted that either at least one profile for future use based on the selected at least one infrastructure use and/or feature may be determined or at least one value representative for at least one profile for future use may be determined based on the selected at least one infrastructure use and/or feature. For example, a number of predetermined profiles may be stored in a memory and each predetermined profile may be associated with a unique identifier. Instead of determining the profile to be used, an identifier of the profile to be used may then be determined. In another example, the luminaire may be installed according to a default profile, and at least one difference value indicating the difference with the default profile may be determined. In yet another example, the luminaire may be operating according to a currently set profile, and at least one difference value indicating the difference with the currently set profile may be determined. Further it is noted that the control system may determine at least one profile for future use based on the selected at least one infrastructure use and/or feature or at least one value representative for at least one profile for future use may be determined based on the selected at least one infrastructure use and/or feature, and that further fine-tuning of the determined at least one profile or value may be done locally within the luminaire, e.g. based on real-time sensed data.

The control system will typically be a remote central control system remote of the plurality of luminaires but could also be a distributed control systems, e.g. a control system where parts of the control system are located in one or more luminaires, and/or in one or more segment controllers or fog devices between the luminaires and a central server.

Preferably, the at least one profile comprises a lighting profile which defines one or more lighting settings of the luminaire in function of time. Preferably, the one or more lighting settings include one or more of the following: light intensity, lighting pattern, light spectrum (e.g. light colour), a dimming level, a light distribution. By lighting pattern or light distribution, it is meant the distribution of the luminous intensity (expressed in candela, cd; or lumen/steradian, lm/sr) as a function of the emission direction of the light leaving the luminaire. The intensity distribution is contained within a spatial envelope of the emitted light.

The luminaire may comprise a light source and an optical element which are moveable with respect to each other so that the lighting pattern may be changed by moving the optical element with respect to the light source. In another example, the light source of the luminaire comprises multiple groups of light emitting elements, which can be driven independently of each other in order to adjust the lighting pattern. Examples of luminaires with a lighting pattern and/or the light spectrum which can be changed in function of time are disclosed in the following patent applications in the name of the applicant which are included herein by reference: PCT/EP2019/087022, PCT/EP2019/087019, PCT/EP2019/087023, PCT/EP2019/087024, PCT/EP2019/087016, PCT/EP2019/087013, PCT/EP2020/053652, PCT/EP2020/054677, NL2024571, PCT/EP2019/069964, PCT/EP2020/087709.

Also other functional units of the luminaire such as sensors or communication interfaces may be operated in accordance with a profile which is based on the selected infrastructure use and/or feature. For example, when the luminaire comprises one or more further functional units such as a pollution sensor and/or a camera and/or a communication means, then the one or more further functional units may be operated in accordance with a profile in function of time which defines one or more operating characteristics of the one or more further functional units in function of time. For example, when the luminaire comprises a camera and a communication means, the camera and the communication means may be operated so that images are communicated with a frequency which is a function of the infrastructure uses and/or features.

According to a preferred embodiment, the position is defined by geo-localization coordinates, preferably by GPS coordinates.

In this manner, an accurate positioning of the luminaires is obtained. The GPS coordinates may be retrieved thanks to a GPS tag of the luminaires, or may be retrieved from a memory storing the installation positions of the luminaires. Alternatively, the geo-localization coordinates may be obtained via a mobile device of a user in close proximity to the luminaire.

According to an exemplary embodiment, the determining of the at least one profile is performed periodically, preferably once a day, more preferably once an hour, most preferably once a minute.

In this way, the determination of the at least one profile may be achieved in a dynamic manner better suited to the local changes in the infrastructure uses and/or features of the luminaires. The periodicity of determining the at least one profile may be similar or different from the selecting of the infrastructure use and/or feature.

According to a preferred embodiment, the method further comprises the step of storing, for each of the one or more luminaires, the at least one profile in a memory of the corresponding luminaire.

In this manner, the luminaires may function accurately without further direct management from a central control system. In an embodiment, the memory of the corresponding luminaire may be included in a luminaire controller of the luminaire.

According to an exemplary embodiment, the plurality of infrastructure uses and/or features comprises any one of: a pedestrian crossing, a cycling crossing, a speed bump, a school, a hospital, a junction, a roundabout, a public building, a low speed area, a transportation stop, a conflict area, a residential use, a night life use, an animal passage use.

The conflict area (see also the CIE 115-2010 standard) may be defined as an area where there is an increased potential for collision between road users, e.g. entry or exit lanes to the highway, crossroads, roundabouts, pedestrian crossings, etc.

According to a further embodiment, the method further comprises a step of obtaining at least one reliability value indicating the reliability of the selected infrastructure use and/or feature. The step of determining the at least one profile may be based on the at least one reliability value. For example, when the reliability value indicates that the selected infrastructure use and/or feature is very reliable, more weight may be given to the selected infrastructure use and/or feature, e.g. in order to determine whether or not to change the at least one profile.

For example, the at least one reliability value may be based on the source of the data indicating the infrastructure use and/or feature, on a time stamp associated to the data indicating the infrastructure use and/or feature, and/or on a number of sources indicating the same infrastructure use and/or feature.

According to a preferred embodiment, the at least one profile comprises any one of: a lighting profile, a sensing profile, a data emitting profile, a sanitizing profile, an operating profile.

The lighting profile defines one or more lighting settings of the luminaire in function of time. The sensing profile defines one or more sensing settings, e.g. accuracy, acquisition rate, number of measurements, of the luminaire in function of time. The data emitting profile defines one or more data emission settings, e.g. bandwidth, frequency of emission, amount of data, packet size, of the luminaire in function of time.

The sanitizing profile defines one or more settings for air purification, e.g. operating times, type of substance purified. For example, where the luminaire comprises a disinfectant means such as a disinfectant spraying device or a UV light, and when the infrastructure use and/or feature affecting parameters indicate that the people traffic is low, an activation profile may be determined in which the disinfectant means are activated and optionally also a flash light is activated to indicate that the luminaire will be spraying disinfectant.

The operating profile is generally associated to a corresponding device comprised in the luminaire and remotely controllably; and the operating profile defines one or more operational setting, e.g. operating times, data acquisition, actuation settings, etc.

According to an exemplary embodiment the at least one profile comprises a lighting profile which defines one or more lighting settings of the luminaire in function of time.

Preferably, the one or more settings include one or more of the following: light intensity, lighting pattern, light spectrum, dimming level, light distribution.

In this way, the lighting may be better adapted to the infrastructure use and/or feature selected. It may also allow obtaining improved security whilst at the same time minimizing energy consumption by adjusting the lighting profile in accordance with the needs.

According to a preferred embodiment, the method further comprises: based on the retrieved position, selecting a pathway type from the infrastructure database said infrastructure database further storing a plurality of different pathway types; based on the selected pathway type, determining, for each of the one more luminaires, one or more predetermined lighting rules defining one or more lighting requirements in function of the pathway type; determining the at least one profile further based on the determined one or more predetermined lighting rules.

Note that luminaires part of the luminaire network are usually installed neighboring a pathway which can be of different types, e.g. a street, a motorway, a bicycle lane, a pedestrian area, a walking path, a temporary road section, etc. The luminaires are controlled to illuminate satisfyingly the neighboring pathway according to its type, among other things. Considering the illumination from a luminaire for example, depending on some characteristics of the pathway, e.g. type, number of lanes, density of traffic, kind of pathway users, the luminaire has to satisfy some lighting standards, e.g. a public road lighting standard, or recommendations, such as EN 13201, IES RP-8, CIE 115.

In this manner, one can obtain at least one profile, preferably a lighting profile, satisfying both the minimum requirements established by the one or more predetermined lighting rules, as well as considerations with respect to the selected infrastructure use and/or feature. In an embodiment, the one or more predetermined lighting rules may help to determine a base lighting profile, and this base lighting profile may be more finely determined and modulated according to the selected infrastructure use and/or feature. In another embodiment, the determined base lighting profile may help to determine the profile of another functional unit of the luminaire, e.g. an image-capturing device, such that both base lighting profile and the profile of the another functional unit are coordinated.

According to an exemplary embodiment, the method further comprises: retrieving traffic data from at least one traffic database; determining the at least one profile further based on the retrieved traffic data.

The existing traffic databases typically comprise current traffic data, e.g. current vehicle traffic data, and/or historical traffic data. By using this traffic data in combination with infrastructure uses and/or features, traffic conditions can be acquired in real time, and/or predicted in an accurate manner for a future time period, typically a rather short period of time in the near future. Taking into account the acquired predicted traffic conditions, one or more profiles, such as a lighting profile defining one or more lighting settings of the luminaire in function of time or a sensing profile defining one or more lighting settings of the luminaire in function of time, can be updated in an improved manner. Indeed, when it is expected that the traffic will be dense in the future time period, due to the presence of a conflict area for example, the light intensity may be increased. In another example, in addition or alternatively, when it is expected that the traffic will be dense in the future time period, a pollution sensor of a luminaire may be activated, e.g. at regular time intervals within the future time period. In other words the operation of a luminaire of the luminaire network can be managed more accurately based on predicted traffic conditions for that luminaire for a future time period. Such an accurate management will allow providing an environment with improved security whilst at the same time minimizing energy consumption by adjusting the at least one profile in accordance with the needs.

Preferably, the one or more traffic databases include one or more of the following: a database containing for a number of locations one or more of the following: a number of vehicles and/or pedestrians that has passed that location during a predefined time period, an average speed of passing vehicles and/or pedestrians at that location, incident related information (e.g. information about a car accident) indicating whether an incident was detected near the location, a ground surface state at that location (e.g. icy road, snow on the surface, etc.), a database based on traffic information from users of navigation system, a database with data retrieved via toll stations, a database with data derived from mobile communication data (e.g. data based on cell phone localization), a database with data based on RDS-TMC (Radio Data System—Traffic Message Channel) traffic messages, a database with information about events, in particular mass events.

According to a preferred embodiment, the method further comprises the steps of: retrieving weather data; wherein retrieving weather data (current and/or forecast) comprises retrieving weather data from at least one weather database and/or retrieving weather data sensed by a sensor associated with one or more luminaires of the plurality of luminaires; and determining the at least one profile further based on the retrieved weather data.

Similarly as above with respect to the retrieval of traffic data, the retrieval of weather data may allow for an improved tailoring of the at least one profile; thereby leading to an environment with improved security whilst at the same time minimizing energy consumption by adjusting the at least one profile in accordance with the needs.

The skilled person will understand that both traffic data and weather data may be used in combination with infrastructure uses and/or features in order to determine the at least one profile. For example, the weather data and the traffic data may be retrieved taking into account a luminaire whose position is defined by geo-localization coordinates, preferably by GPS coordinates.

According to an exemplary embodiment, the plurality of infrastructure uses and/or features includes uses and/or features data in function of time.

In this way, the at least one profile may be determined more accurately relative to its daily setting. For example, for a bus stop infrastructure feature, an indication of the time periods when the bus stop is used may be linked to the infrastructure use. The lighting profile may then be set so that the light intensity is increased when the bus stop is expected to be in use.

According to a preferred embodiment, the method further comprises retrieving environmental sensor data from one or more environmental sensors associated with one or more luminaires of the plurality of luminaires; wherein the step of determining the at least one profile is further based on the environmental sensor data.

For example, the determining of the at least one profile may be further based on data sensed by a light sensor or a motion sensor of one or more luminaire of the luminaire network. The one or more environmental sensors may comprise one or more of the following: a light sensor, an image sensor, a motion detector, sound sensor, a Doppler-effect radar sensor, a pollution sensor, a humidity sensor, a temperature sensor, a visibility sensor.

According to an exemplary embodiment, the plurality of infrastructure uses and/or features is related to uses and/or features added to a pathway.

By uses and/or features added to the pathway, it is meant all the uses and/or features which are modifying the regular course of the pathway, such as conflict areas, low speed areas, speed bumps, shared use by different users, traffic lights, temporary work areas, etc.

According to a preferred embodiment, the plurality of infrastructure uses and/or features is related to uses and/or features neighboring a pathway.

By uses and/or features neighboring a pathway, it is means all the uses and/or features belonging to the landscape surrounding the pathway, such as the presence of public buildings, transportation stops, parking lots, animal habitat zone, the presence of night life, residences, etc.

According to an exemplary embodiment, the method is performed upon commissioning a new luminaire in the luminaire network, preferably performed by a segment controller of the luminaire network.

Alternatively or additionally, the method may be performed after each modification of the plurality of infrastructure uses and/or features.

In this manner, the at least one profile is determined as soon as the new luminaire is ready for use.

According to a further aspect of the invention, there is provided a computer program comprising computer-executable instructions to perform or control the steps of the method, when the program is run on a computer, according to any one of the embodiments of the method disclosed above.

According to a further aspect of the invention, there is provided a computer device or other hardware device programmed to perform or control the steps performed by the luminaire controller of any one of the embodiments disclosed above.

According to another aspect there is provided a data storage device encoding a program in machine-readable and machine-executable form to perform or control the steps performed by the luminaire controller of any one of the embodiments disclosed above.

Typically, the luminaires are outdoor luminaires. By outdoor luminaires, it is meant luminaires which are installed on roads, tunnels, industrial plants, stadiums, airports, harbours, rail stations, campuses, parks, cycle paths, pedestrian paths or in pedestrian zones, for example, and which can be used notably for the lighting of an outdoor area, such as roads and residential areas in the public domain, private parking areas and access roads to private building infrastructures, etc.

Communication technologies used by OLNs include any one or more of: an IEEE 802.15.4-based protocol, such as a Zigbee protocol, WiFi, cellular (GPRS, 3G/4G/5G), LPWAN, e.g. a LoRaWAN or a SigFox, and power line communication networks.

According to another aspect of the invention, there is provided a control system for a luminaire network comprising a plurality of luminaires, each luminaire of said plurality of luminaires being configured to operate in accordance with at least one profile which defines one or more settings of the luminaire in function of time, said control system being configured for: retrieving a position of one or more luminaires of the plurality of luminaires from a luminaire network database; based on the retrieved position, selecting an infrastructure use and/or feature from an infrastructure database, said infrastructure database storing a plurality of different infrastructure uses and/or features; determining, for each of the one or more luminaires, at least one profile based on the selected infrastructure use and/or feature. Depending on embodiments, the infrastructure database may be stored in a storage means part of the control system, or the infrastructure database may be obtained by the control system from a communication means of the control system connected to a remote storage means external from the control system, e.g. a remotely accessible database managed by a city, region, or state.

Preferred embodiments of the control system are disclosed in the claims. The technical merits of the embodiments of the method apply mutatis mutandis on the various embodiments of the control system. Also, the control system may be configured to perform any one of the above disclosed method steps.

According to another aspect of the invention, there is provided a luminaire network comprising a plurality of luminaires and a control system according to any one of the embodiments above for managing said plurality of luminaires.

According to another aspect of the invention, there is provided a method of performing management in a luminaire network comprising a plurality of luminaires and a control system, each luminaire of said plurality of luminaires being configured to operate in accordance with at least one profile which defines one or more settings of the luminaire in function of time. The method comprises performing by said control system the steps of: retrieving image data associated with a luminaire of the plurality of luminaires, said image data picturing at least one infrastructure neighboring the luminaire; based on the retrieved image data, selecting at least one infrastructure use and/or feature from an infrastructure database, said infrastructure database storing a plurality of different infrastructure uses and/or features; determining, for the luminaire, at least one profile based on the selected at least infrastructure use and/or feature.

Preferred embodiments of the latter method are disclosed in the claims. The technical merits of the embodiments of the first method apply mutatis mutandis on the various embodiments of the latter method. Also, the latter method may comprise steps any one of the above disclosed first method steps.

By this approach, image data may advantageously be used for identification of relevant infrastructures neighboring a luminaire of the luminaire network. The relevant infrastructures may be identified using image recognition techniques. In an embodiment, the identified at least one infrastructure may be stored as data in the infrastructure database. It is understood by the skilled person that this method may be performed similarly for a plurality of luminaires of the luminaire network.

According to a preferred embodiment, the retrieving of image data comprises capturing, by an image capturing device of the luminaire, an image picturing the at least one infrastructure neighboring the luminaire.

In this way, the luminaires in the luminaire network may gather data related to neighboring infrastructures by themselves.

According to another aspect of the invention, there is provided a method of performing management in a luminaire network comprising a plurality of luminaires and a control system. The method comprises performing by said control system the steps of: associating to each luminaire of the plurality of luminaire at least one infrastructure use and/or feature from an infrastructure database, said infrastructure database storing a plurality of different infrastructure uses and/or features; performing one or more actions based on the associated at least one infrastructure use and/or feature.

Preferred embodiments of the latter method are disclosed in the claims. The technical merits of the embodiments of the first method apply mutatis mutandis on the various embodiments of the latter method. Also, the latter method may comprise steps any one of the above disclosed first method steps.

By this approach, the one or more actions performed may be more adapted to the local reality of each luminaire of the luminaire network. The control of each luminaire may be individualized and tailored for a better efficiency with respect to its surroundings. The associating of the at least one infrastructure use and/or feature may be implemented by adding the at least one infrastructure use and/or feature as infrastructure data directly linked to each luminaire. The at least one infrastructure use and/or feature may be indicated as a tag associated to each luminaire, with a tag wording similar for all luminaires of the luminaire network for similar infrastructure uses an/or features. A luminaire of the luminaire network may be associated with more than one tag. It is understood by the skilled person that this method may be performed similarly for a plurality of luminaires of the luminaire network.

In a preferred embodiment, each luminaire of said plurality of luminaires is configured to operate in accordance with at least one profile which defines one or more settings of the luminaire in function of time, and the performing of the one or more actions comprises transmitting, by the control system, a profile common to a plurality of luminaires being associated with a similar infrastructure use and/or feature to said plurality of luminaires.

In this manner, the plurality of luminaires with at least one similar infrastructure and/or feature may be controlled more uniformly by the control system.

In an exemplary embodiment, the performing of the one or more actions comprises performing a same action for a plurality of luminaires being associated with a similar infrastructure use and/or feature.

In this way, a user of the control system may easily manage and control jointly the plurality of luminaires being affected, or affecting, in a similar manner by a similar infrastructure use and/or feature.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
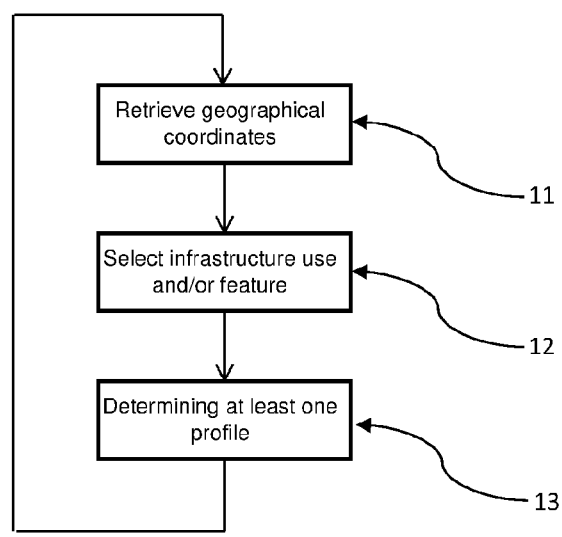
FIG. 1 illustrates a flow chart of an exemplary embodiment of a method for managing a luminaire of a luminaire network.

FIG. 1 illustrates a flow chart of an exemplary embodiment of a method for managing a luminaire of a luminaire network according to the present invention.

The method of the present invention allows performing management in a luminaire network comprising a plurality of luminaires. Each luminaire of said plurality of luminaires are configured to operate in accordance with at least one profile which defines one or more settings of the luminaire in function of time.

The luminaire typically comprises a light source, an optical element, one or more further components such as a sensor or a communication interface, and a driver for driving the light source and optionally for driving also one or more further components. Typically the luminaire is an outdoor luminaire as defined above with a luminaire head or a luminaire pole module having a housing comprising at least the light source and the optical element. The luminaire head may be mounted on a base, typically a pole, either in a post-top or side-entry configuration. Examples of such luminaire heads are disclosed in Dutch patent applications NL2023431 and NL2025081 in the name of the applicant which are included herein by reference.

A luminaire pole module may be part of a modular luminaire comprising multiple pole modules arranged one above the other. Examples such modular luminaires are disclosed in EP3076073B1, WO2019043045A1, WO2019053259A1, and NL2024248 in the name of the applicant which are included herein by reference.

Typically, the luminaire of the luminaire network may be installed in proximity to a neighboring pathway that can be taken by vehicles and/or pedestrians. The pathway may be a pathway on a lighting site suitable for outdoor luminaires. By lighting site for outdoor luminaires, it is meant roads, tunnels, industrial plants, stadiums, airports, harbors, rail stations, campuses, parks, cycle paths, pedestrian paths, or pedestrian zones for example, and outdoor luminaires can be used notably for the lighting of an outdoor area, such as roads and residential areas in the public domain, private parking areas and access roads to private building infrastructures, etc. In other embodiments according to the invention, the pathway may be located indoors, such as in a warehouse or an industry hall.

Management of an outdoor lighting network (OLN) may be remotely managed to control a lighting behaviour (e.g. scheduling of the on/off times of the luminaires and/or setting dimming levels of the lighting units) and/or to monitor luminaire characteristics (e.g. light source status, energy consumption, luminaire specifications, etc.). Management of outdoor lighting networks may provide one or more benefits to customers (e.g. municipalities) such as increased security, energy savings, reduced maintenance costs, and reduced lighting pollution, etc.

Various functional units of luminaires may be managed like so. For example, the functional unit may be any one of: a lighting unit, a display unit, an antenna unit, a sensing unit, a speaker unit, an air cleaning unit such as a UV light source, etc. The sensing unit may comprise a pollution sensor, a motion sensor, a humidity sensor, a light sensor, a temperature sensor, a visibility sensor, an image capturing sensor, a radar sensor, a sound sensor, a voice recorder, a $CO_2$ sensor, a $NOx$ sensor, a $SOx$ sensor, a smoke sensor, a biological threat sensor, an infrared sensor, a thermal sensor. Depending on the functional unit, the utilization of the functional unit may differently affect or be affected by their local reality, part of their individual functional coverage.

The control system will typically be a remote central control system remote of the plurality of luminaires but could also be a distributed control systems, e.g. a control system where parts of the control system are located in one or more luminaires.

One or more luminaires of an outdoor luminaire network typically comprises an outdoor lighting controller (OLC) capable of managing one or more luminaires by means of communication protocols. The OLCs may form a large network in which the communication links are based, e.g. on IEEE 802.15.4 or on a LoRa wireless data communication technology. The network may be managed from the back-end by means of a plurality of segment controllers connecting the networks with the Internet. In such a solution an OLC includes a central processing unit (CPU) and a communication interface. In addition or alternatively, the OLC itself may be capable of communicating directly with the Internet.

Communication technologies used by OLNs include any one or more of: an IEEE 802.15.4-based protocol, such as a Zigbee protocol, WiFi, cellular (GPRS, 3G/4G/5G), LPWAN, e.g. a LoRaWAN or a SigFox, and power line communication networks.

As can be seen in the embodiment of FIG. 1, the method comprises the step S11 of retrieving a position of one or more luminaires of the plurality of luminaires from a luminaire network database. The luminaire network database may comprise the position as a local referencing with respect to the neighboring pathway, or as a measurement made on site during installation of the luminaires, or as an position extracted from a map or a visual representation of a lighting site where luminaires are installed. In an embodiment, the position of the one or more luminaires may be defined by geo-localization coordinates, preferably by GPS coordinates. The position of the one or more luminaires may also be retrieved by processing information located in more than one luminaire network databases.

As can be seen in the embodiment of FIG. 1, the method comprises the step S12 of selecting, based on the retrieved position, an infrastructure use and/or feature from an infrastructure database, said infrastructure database storing a plurality of different infrastructure uses and/or features. The infrastructure database may be a database managed by local authorities, e.g. municipalities, region, state, by infrastructure managing companies, and/or by companies aggregating mapping data. The infrastructure uses and/or features may comprise an indication of time and/or a indication of space. For example, geographical positions of the infrastructures may be stored in the infrastructure database. It is generally related to an increase or decrease of human activity in a specific local area during a given time period.

In an embodiment, the plurality of infrastructure uses and/or features are related to uses and/or features added to a pathway. By uses and/or features added to the pathway, it is meant all the uses and/or features which are modifying the regular course of the pathway, such as conflict areas, low speed areas, speed bumps, shared use by different users, traffic lights, temporary work areas, etc. The conflict area (see also the CIE 115-2010 standard) may be defined as an area where there is an increased potential for collision between road users, e.g. entry or exit lanes to the highway, crossroads, roundabouts, pedestrian crossings, etc.

In another embodiment, the plurality of infrastructure uses and/or features is related to uses and/or features neighboring a pathway. By uses and/or features neighboring a pathway, it is means all the uses and/or features belonging to the landscape surrounding the pathway, such as the presence of public buildings, transportation stops, parking lots, animal habitat zone, the presence of night life, residences, etc.

For example, in an embodiment, the infrastructure uses and/or features may indicate that the traffic will be dense in a certain area during a rush hour period due to the presence of a speed bump or a roundabout. In another embodiment, the infrastructures uses and/or features may indicate that a school is neighboring the street and running children are to be expected at the start and end of the school day. In yet another embodiment, the infrastructures uses and/or features may indicate that it is a street only for residential use with a low traffic density during the midst of the night. In still another embodiment, the infrastructures uses and/or features may indicated that there is a bus stop installed with a regular passage of buses following a given schedule.

Note that a plurality of infrastructure uses and/or features may be selected for a single luminaire and that a corresponding plurality of profiles may be determined for said luminaire. Additionally, the plurality of profiles may be a plurality of lighting profiles with time overlaps, and, for safety reasons, a profile with the light intensity maxima among the plurality of profiles may be determined.

More than one infrastructure uses and/or features may be selected for each luminaire. Depending on the position of the luminaire and the spatial extent of the infrastructure use and/or feature, the selected infrastructure use and/or feature may concern a plurality of luminaires or a single luminaire. Also, depending on the selected infrastructure use and/or feature, one or more functional units of the luminaire may be affected.

The selecting of the infrastructure use and/or feature may be performed manually by a user faced with a selection interface, and/or automatically by the control system. In an embodiment, a given infrastructure in the infrastructure database may be already associated with a limited list of infrastructure uses and/or features, and, when a position of a luminaire is within a predetermined range of the given infrastructure, the control system automatically selects the corresponding limited list of infrastructure uses and/or features and associates this list to the luminaire within range.

As can be seen in the embodiment of FIG. 1, the method comprises the step S13 of determining, for each of the one or more luminaires, at least one profile based on the selected infrastructure use and/or feature. Depending on characteristics of the functional unit of the luminaire and on the selected infrastructure use and/or feature, said functional unit may be affected differently. The aim is to determine the at least one profile to improve the usage of the functional unit with respect to the local needs within its effective functional range.

For example, in an embodiment with a luminaire neighboring a risk prone area due to high traffic density during rush hour caused by a roundabout, a profile of an image-capturing device of the luminaire may be determined to increase during the rush hour the image capturing rate. In another embodiment with a luminaire neighboring a school, a profile of a lighting of the luminaire may be determined to increase the light intensity at the start and end of the school day in winter for safety reasons. In yet another embodiment with a luminaire located in a residential area, a profile of a speaker of the luminaire may be determined to be capped at a specific sound level during the wee hours of the night. In still another embodiment with a luminaire located next to a bus stop, a profile of a lighting of the luminaire may be coordinated with the passage schedule of buses.

It is noted that either at least one profile for future use based on the selected at least one infrastructure use and/or feature may be determined or at least one value representative for at least one profile for future use may be determined based on the selected at least one infrastructure use and/or feature. For example, a number of predetermined profiles may be stored in a memory and each predetermined profile may be associated with a unique identifier. Instead of determining the profile to be used, an identifier of the profile to be used may then be determined. In another example, the luminaire may be installed according to a default profile, and at least one difference value indicating the difference with the default profile may be determined. In yet another example, the luminaire may be operating according to a currently set profile, and at least one difference value indicating the difference with the currently set profile may be determined. Further it is noted that the control system may determine at least one profile for future use based on the selected at least one infrastructure use and/or feature or at least one value representative for at least one profile for future use may be determined based on the selected at least one infrastructure use and/or feature, and that further fine-tuning of the determined at least one profile or value may be done locally within the luminaire, e.g. based on real-time sensed data.

Preferably, the at least one profile comprises a lighting profile which defines one or more lighting settings of the luminaire in function of time. Preferably, the one or more lighting settings include one or more of the following: light intensity, lighting pattern, light spectrum (e.g. light colour), a dimming level, light distribution. By lighting pattern or light distribution, it is meant the distribution of the luminous intensity (expressed in candela, cd; or lumen/steradian, lm/sr) as a function of the emission direction of the light leaving the luminaire. The intensity distribution is contained within a spatial envelope of the emitted light.

In an embodiment, a plurality of infrastructure uses and/or features has been selected for a single luminaire. A weight may be associated to each of the plurality of infrastructure uses and/or features depending on their importance in terms of safety. The at least one profile may be determined taking into account the plurality of weighted infrastructure uses and/or features.

Additionally or alternatively, a plurality of profiles may be determined for a single functional unit of the single luminaire, each of the plurality of profiles corresponding to a different infrastructure use and/or feature.

Figure 2:
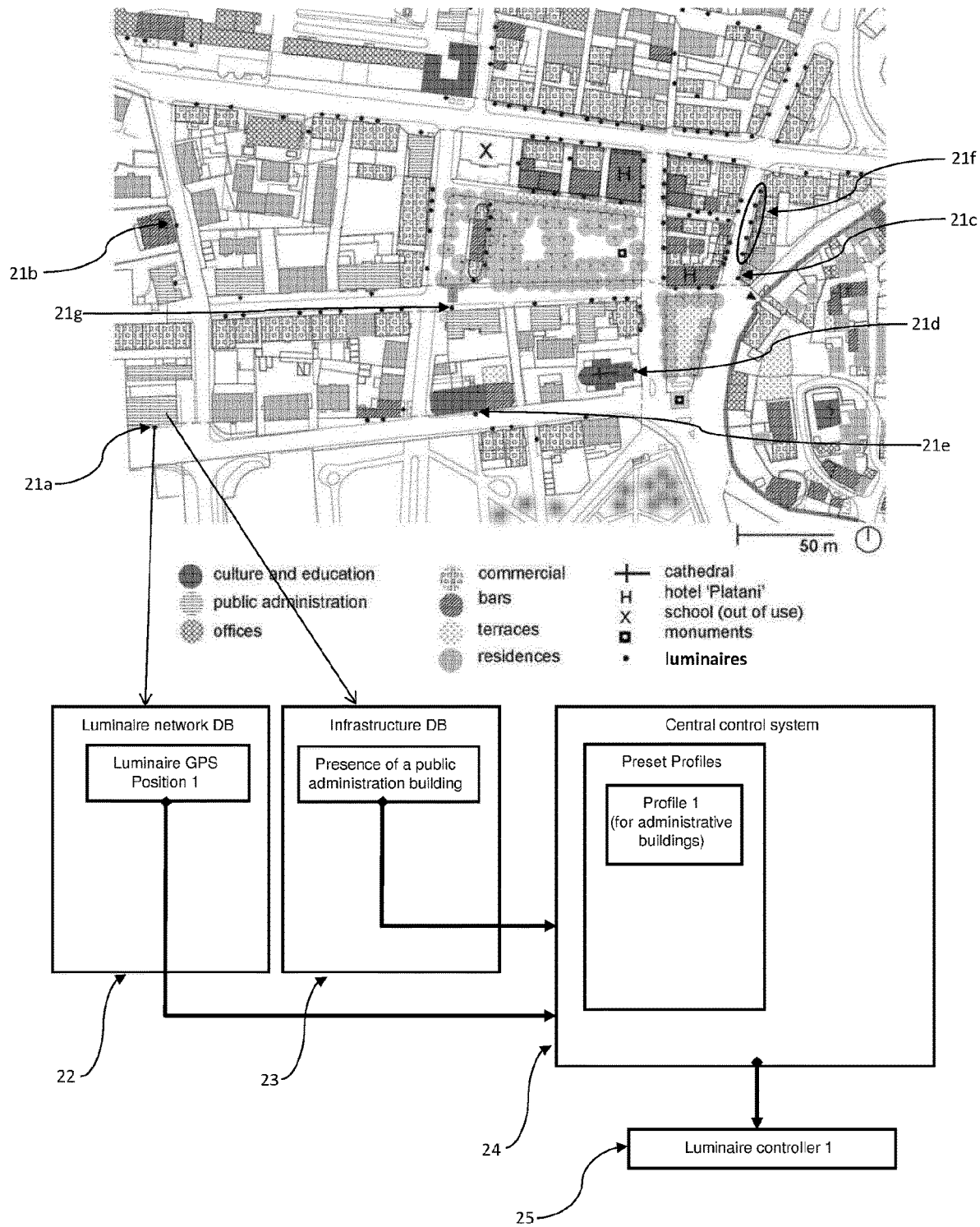
FIG. 2 pictures a luminaire network according to an exemplary embodiment.

FIG. 2 pictures a luminaire network according to an exemplary embodiment according to the present invention. The luminaire network comprises a control system 24, 25 and a plurality of luminaires 21a, 21b, 21c, 21d, 21e, 21f, 21g.

In the embodiment of FIG. 2, the control system 24, 25 comprises a remote central control system 24 remote of the plurality of luminaires where parts of the control system 24, 25 are located in one or more luminaires, located in outdoor luminaire controllers 25 in the embodiment of FIG. 2. The outdoor luminaire controller (OLC) may be capable of managing one or more luminaires by means of communication protocols. The OLCs may form a large network in which the communication links are based e.g. on IEEE 802.15.4 or on a LoRa wireless data communication technology. The network may be managed from the back-end, the central control system 24, by means of a plurality of segment controllers (not shown) connecting the network with the Internet.

The central control system 24 may perform the step of retrieving a position of a first luminaire 21a of the plurality of luminaires 21a, 21b, 21c, 21d, 21e, 21f, 21g from a luminaire network database 22. The position of the first luminaire 21a is defined by GPS coordinates in the embodiment of FIG. 2. The luminaire network database 22 may be an internal database of a company having installed the first luminaire 21a. Alternatively, the luminaire network database 22 may be a database from a local authority.

The central control system 24 may perform the step, based on the retrieved position, of selecting an infrastructure use and/or feature from an infrastructure database 23, said infrastructure database 23 storing a plurality of different infrastructure uses and/or features. The infrastructure database 23 may be a database managed by local authorities, e.g. municipalities, region, state, by infrastructure managing companies, and/or by companies aggregating mapping data. The infrastructure uses and/or features may comprise an indication of time and/or an indication of space. For example, geographical positions of the infrastructures may be stored in the infrastructure database. It is generally related to an increase or decrease of human activity in a specific local area during a given time period. In the embodiment of FIG. 2, the infrastructure neighboring the first luminaire 21a corresponds to a public administration building. Such infrastructure corresponds to a regular flow of people in and out the main entrance of the building during the working hours of the weekdays.

The central control system 24 may perform the step of determining, for the first luminaire 21a, at least one profile based on the selected infrastructure use and/or feature. For example, the first luminaire 21a may comprise a speaker diffusing information related to the neighboring public administration and the scheduling of the diffusion may be determined on the use of the infrastructure having a regular flow of people in and out the main entrance of the building during the working hours of the weekdays.

The central control system 24 may then perform the step of storing, for the first luminaire 21a, the at least one profile in a memory of the corresponding luminaire. For example the first luminaire 21a may be controlled by the associated luminaire controller 25 and the at least one profile is stored in the memory of the luminaire controller 25.

Similar steps may be performed by the central control system 24 for a second luminaire 21b, a third luminaire 21c, a fourth luminaire 21d, a fifth luminaire 21e, a group of luminaires 21f, and a sixth luminaire 21g.

The second luminaire 21b may be positioned in proximity with a bar, which is an infrastructure affected with a night life activity, but also close to residences. So a lighting profile of the second luminaire 21b may be determined such that there is an increased lighting intensity during the late opening hours of the bar to improve safety conditions. Additionally, the lighting profile of the second luminaire 21b may be determined such that there is a change in a light temperature of the light emitted as the bar closing time is approaching, such that clients are not encouraged to stay after the closing hour for example.

The third luminaire 21c may be positioned at a junction of two streets, which can have a higher risk of accidents during rush hours. A profile for an image-capturing device of the third luminaire 21c may be determined to increase to image capturing rate during the rush hour. A lighting profile of the third luminaire 21c may also be determined to increase a lighting intensity during nighttime at this junction.

In another embodiment, image data associated with the third luminaire 21c may be retrieved, said image data picturing the junction of the two streets neighboring the third luminaire 21c. For example the image data may be retrieved by the image-capturing device of the third luminaire 21c capturing said image data. Based on the retrieved image data, the at least one infrastructure use and/or feature may be selected, and at least one profile of the third luminaire 21c may be determined based on the selected at least one infrastructure use and/or feature. The at least one profile determined may be similar to the one described above.

The fourth luminaire 21d may be positioned close to a cathedral, a monument, and a square, which suggests infrastructures with a large number of people passing and stopping by during the day. The fourth luminaire 21d may comprise an antenna configured for Wi-Fi communication and a profile for this antenna may be determined during the day to increase bandwidth.

The fifth luminaire 21e may be positioned close to a cultural building, e.g. a museum, with a bus stop nearby, and in a commercial area. The fifth luminaire 21e may be equipped with a pollution sensor. When it is expected that the traffic will be dense in the future time period, the pollution sensor of the fifth luminaire 21e may be activated to allow evaluating an air quality for the users. For the bus stop infrastructure feature, an indication of the time periods when the bus stop is used may be linked to the infrastructure use. The lighting profile of the fifth luminaire 21e may then be set so that the light intensity is increased when the bus stop is expected to be in use, for example by coordinating a bus passage schedule and the lighting profile of the fifth luminaire 21e.

In contrast, the group of luminaires 21f may be positioned along a street and no infrastructure use and/or feature has been selected or is present at a relatively close distance from the group of luminaires 21f. The street neighbouring the group of luminaires 21f may be affected to a specific pathway type and associated to one or more corresponding predetermined lighting rules. The one or more predetermined lighting rules may help to determine a base lighting profile for the group of luminaires 21f. In an embodiment, the third luminaire 21c may also be associated with the same base lighting profile of the group of luminaires 21f, and the determined lighting profile may be more finely determined and modulated based on the based lighting profile and according to the selected infrastructure use and/or feature for the third luminaire 21c.

In an embodiment, each luminaire of the group of luminaires 21f may be associated with at least one infrastructure use and/or feature from an infrastructure database, for example associated with an area having commercial use. The control system may then perform one or more actions based on the associated at least one infrastructure use and/or feature. For example, each luminaire of the group of luminaires 21f may be configured to operate in accordance with at least one profile which defines one or more settings of the luminaire in function of time, and the performing of the one or more actions may comprise transmitting, by the control system, a common profile common to the group of luminaires 21f. Additionally or alternatively, the performing of the one or more actions may comprises performing a same action for the group of luminaires 21f.

The sixth luminaire 21g may be positioned facing a pedestrian crossing. The sixth luminaire 21g may also be equipped with a proximity sensor. During nighttime, a lighting profile may be determined for the sixth luminaire 21*g* to modify a lighting profile of the sixth luminaire 21*g* such that pedestrians may be more easily seen when crossing, stronger light intensity for example. Another lighting profile of the sixth luminaire 21*g* may be determined when the proximity sensor detects an approaching pedestrian intent on crossing, blinking lighting pattern for example.

Figure 3:
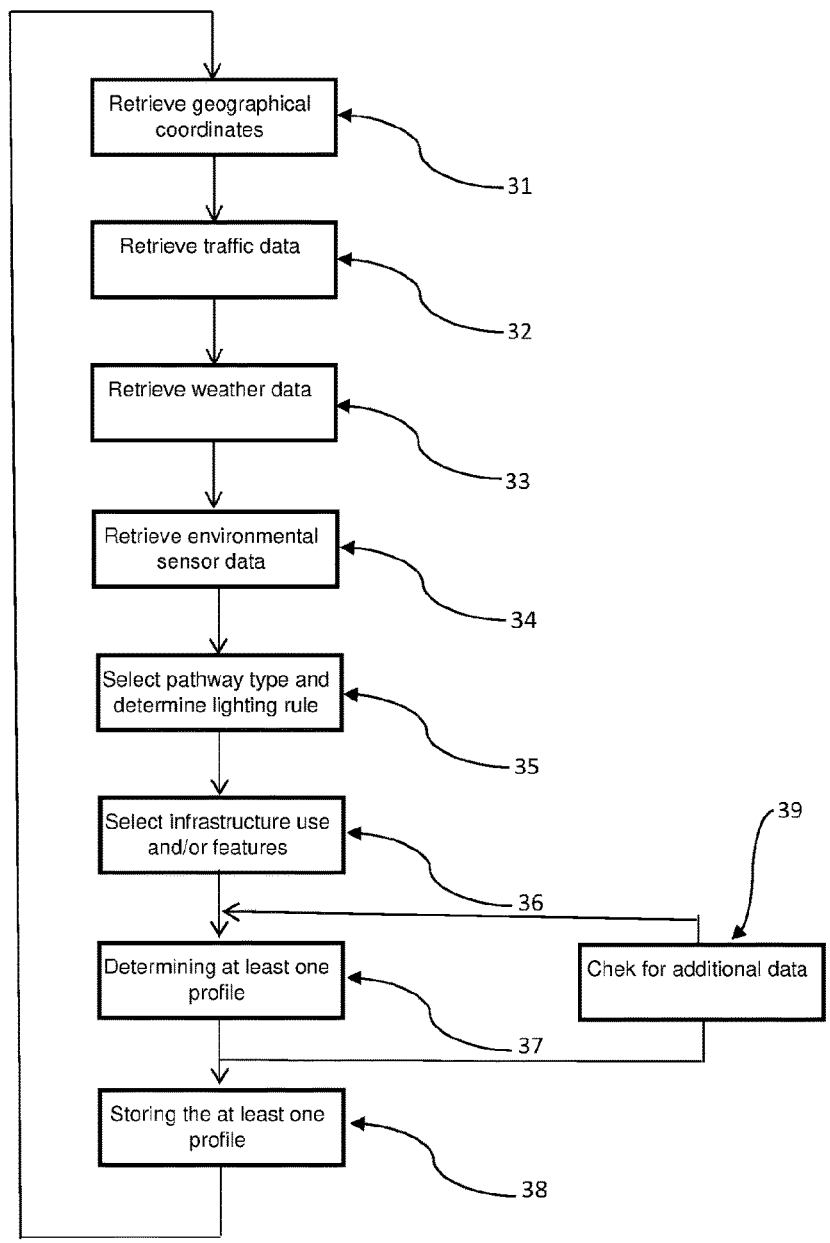
FIG. 3 illustrates a flow chart of an exemplary embodiment of a method for managing a luminaire of a luminaire network.

FIG. 3 illustrates a flow chart of an exemplary embodiment of a method for managing a luminaire of a luminaire network according to the present invention.

As can be seen in the embodiment of FIG. 3, the method comprises a step S31 of retrieving a position of one or more luminaire of the plurality of luminaires from a luminaire network database. The step S31 may be similar to the step S11 of FIG. 1.

As can be seen in the embodiment of FIG. 3, the method comprises a step S32 of retrieving traffic data from at least one traffic database. The existing traffic databases typically comprise current traffic data. By using this traffic data in combination with infrastructure uses and/or features, traffic conditions can be acquired in real time, and optionally be predicted in an accurate manner for a future time period, typically a rather short period of time in the near future. In step S37 of the embodiment of FIG. 3, taking into account the acquired or predicted traffic conditions, one or more profiles, such as a lighting profile defining one or more lighting settings of the luminaire in function of time or a sensing profile defining one or more lighting settings of the luminaire in function of time, can be updated in an improved manner. Indeed, when it is expected that the traffic will be dense in the future time period, due to the presence of a conflict area for example, the light intensity may be increased. In another example, in addition or alternatively, when it is expected that the traffic will be dense in the future time period, a pollution sensor of a luminaire may be activated, e.g. at regular time intervals within the future time period. In other words the operation of a luminaire of the luminaire network can be managed more accurately based on predicted traffic conditions for that luminaire for a future time period.

As can be seen in the embodiment of FIG. 3, the method comprises a step S33 of retrieving weather data. The retrieving of weather data S33 comprises retrieving weather data from at least one weather database and/or retrieving weather data sensed by a sensor associated with one or more luminaires of the plurality of luminaires. Similarly as above with respect to the retrieval of traffic data S32, the retrieval of weather data S33 may allow for an improved tailoring of the at least one profile in step S37; thereby leading to an environment with improved security whilst at the same time minimizing energy consumption by adjusting the at least one profile in accordance with the needs.

As can be seen in the embodiment of FIG. 3, the method comprises a step S34 of retrieving environmental sensor data from one or more environmental sensors associated with one or more luminaires of the plurality of luminaires. In an embodiment, the determining of the at least one profile S37 may be further based on data sensed by a light sensor or a motion sensor of one or more luminaire of the luminaire network. The one or more environmental sensors may comprise one or more of the following: a light sensor, an image sensor, a motion detector, sound sensor, a Doppler-effect radar sensor, a pollution sensor, a humidity sensor, a temperature sensor, a visibility sensor.

As can be seen in the embodiment of FIG. 3, the method comprises a step S35 of, based on the retrieved position, selecting a pathway type from the infrastructure database said infrastructure database further storing a plurality of different pathway types, and, based on the selected pathway type, determining, for each of the one more luminaires, one or more predetermined lighting rules defining one or more lighting requirements in function of the pathway type.

Indeed, depending on some characteristics of the pathway, e.g. number of lanes, density of traffic, type of pathway users, a luminaire neighboring may have to satisfy some lighting rules, such as standards, e.g. a public road lighting standard, or recommendations, such as EN 13201, IES RP-8, CIE 115.

Then, in step S37, one can determine at least one profile, preferably a lighting profile, satisfying both the minimum requirements established by the one or more predetermined lighting rules, as well as satisfying considerations with respect to the selected infrastructure use and/or feature. In an embodiment, the one or more predetermined lighting rules may help to determine a base lighting profile, and this base lighting profile may be more finely determined and modulated according to the selected infrastructure use and/or feature. In another embodiment, the determined base lighting profile may help to determine the profile of another functional unit of the luminaire, e.g. an image-capturing device, such that both base lighting profile and the profile of the another functional unit are coordinated.

The selecting of the pathway type S35 may be performed manually by a user faced with a selection interface, and/or automatically by the control system. In an embodiment, a given infrastructure in the infrastructure database may be already associated with a pathway type, e.g. a pathway class, and, when a position of a luminaire is within a predetermined range of the given infrastructure, the control system automatically selects the corresponding pathway type and determines the one or more predetermined lighting rules corresponding to the luminaire within range.

As seen in the embodiment of FIG. 3, the method comprises the step S36 of, based on the retrieved position, selecting an infrastructure use and/or feature from an infrastructure database, said infrastructure database storing a plurality of different infrastructure uses and/or features. The step S36 of FIG. 3 may be similar to the step S12 of FIG. 1.

Embodiments of step S37 in FIG. 3 may be similar to step S13 of FIG. 1.

As can be seen in the embodiment of FIG. 3, the method comprises the step S38 of storing, for each of the one or more luminaires, the at least one profile in a memory of the corresponding luminaire. The luminaires may function accurately without further direct management from a central control system. In an embodiment, the memory of the corresponding luminaire may be included in a luminaire controller associated to the luminaire.

In an embodiment, the determining of the at least one profile S37 is performed periodically, preferably once a day, more preferably once an hour, most preferably once a minute.

In this way, the determination of the at least one profile S37 may be achieved in a dynamic manner better suited to the local changes in the infrastructure uses and/or features of the luminaires. The periodicity of determining the at least one profile S37 may be similar or different from the selecting of the infrastructure use and/or feature S36.

It is to be noted that, although the steps in FIG. 3 are presented in a sequential manner, steps S32-S35 may be performed additionally or alternatively in the step S39 of checking for additional data. Step S36 may also be performed in step S39.

In the above embodiments, the determining, for each of the one or more luminaires, of the at least one profile based on the selected infrastructure use and/or feature may depend on a weighted sum of one or more parameters associated to the selected infrastructure use and/or feature, or may depend on the parameter with the heaviest weight value among the one or more parameters associated to the selected infrastructure use and/or feature. The parameters considered and associated weight may be seen in the following table. The skilled person will understand that the parameters and weight values below are not limiting and may be adapted following the desired degrees of tuning when determining the at least one profiled.

In an embodiment, a luminaire may be in close proximity to two infrastructures features: a speed bump and a school. Both the speed bump and the school may be associated to the parameter of a low recommended speed. Additionally, the school has a time-dependent infrastructure use which may be associated to a high traffic volume with a user composition of mixed vehicles, pedestrians, and bicycles when the school starts and finishes during week days. Depending on the time of the day, the weighted sum taking into account the weight values of the above mentioned parameters is used as basis to determine the at least one profile of a lighting unit of the luminaire.

In another embodiment, a luminaire may be in close proximity to one infrastructure feature: a junction where a bicycle lane separated from a city road joins that road. The junction may be associated to a low recommended speed, a mixte traffic composition, no lane separation, and the presence of a conflict area.

In yet another embodiment, a luminaire may be in close proximity to a restaurant in a pedestrian street. The restaurant may correspond to a selected infrastructure use and associated to a high traffic volume during lunch and dinner times. The pedestrian street may correspond also to a selected infrastructure use with a mixte traffic composition during delivery hours to the restaurant.

In still another embodiment, a luminaire may be in close proximity to a city street consisting of two lanes with parking areas on each side, and with road works blocking one of the two lanes. To the road works, one can associate a high traffic volume, motorized only traffic composition, with a low recommended speed. To the city street, one can associate the presence of parked vehicles.

The skilled person will understand that the parameters considered may not be limited to the ones mentioned in the table below, and the at least one profile determined may also be based on a base lighting profile depending on a detected natural light intensity and/or the time of the day, said base lighting profile being adapted based on a weighted sum of the one or more parameters associated to the selected infrastructure use and/or feature, or based on the parameter with the heaviest weight value among the one or more parameters associated to the selected infrastructure use and/or feature.

| Parameters | Options | Description | | Weight value |
|---|---|---|---|---|
| Recommended speed | Very high | s >= 100 km/h | | 2 |
| | High | 70 < s < 100 km/h | | 1 |
| | Medium | 40 < s <= 70 km/h | | −1 |
| | Low | s <= 40 km/h | | −2 |
| | | Motorways | Others | |
| Traffic volume | High | >65% of the max. capacity | >45% of the max. capacity | 1 |
| | Medium | 35 to 65% of the max. capacity | 15 to 45% of the max. capacity | 0 |
| | Low | <35% of the max. capacity | <15% of the max. capacity | −1 |
| Traffic composition | Mixte with a high proportion of non-motorized users | | | 2 |
| | Mixte | | | 1 |
| | Motorized only | | | 0 |
| Lanes separation | Yes | | | 0 |
| | No | | | 1 |
| Conflict area | Yes | | | 0 |
| | No | | | 1 |
| Parked vehicles | Yes | | | 0 |
| | No | | | 1 |

Whilst the principles of the invention have been set out above in connection with specific embodiments, it is to be understood that this description is merely made by way of example and not as a limitation of the scope of protection which is determined by the appended claims.

The invention claimed is:

1. A method of performing management in a luminaire network comprising a plurality of luminaires and a control system, each luminaire of said plurality of luminaires being configured to operate in accordance with at least one profile which defines one or more settings of the luminaire in function of time, said method comprising performing by said control system the steps of:
retrieving a position of one or more luminaires of the plurality of luminaires from a luminaire network database, said position being preferably defined by geo-localization coordinates, more preferably by GPS coordinates;
based on the retrieved position, selecting an infrastructure use and/or feature from an infrastructure database, said infrastructure database storing a plurality of different infrastructure uses and/or features,
wherein the infrastructure comprises: a public building, a public area, a pathway element, or a pathway zone;

determining, for each of the one or more luminaires, at least one profile based on the selected infrastructure use and/or feature, said determining being performed preferably periodically, more preferably once a day, even more preferably once an hour, most preferably once a minute; and optionally, storing, for each of the one or more luminaires, the at least one profile in a memory of the corresponding luminaire.

2. The method according to claim 1, wherein the plurality of infrastructure uses and/or features comprises: a parking lot, a pedestrian crossing, a cycling crossing, a speed bump, a school, a hospital, a junction, a roundabout, a public building, a low speed area, a transportation stop, a conflict area, a residential use, a night life use, or an animal passage use.

3. The method according to claim 1, wherein the at least one profile comprises: a lighting profile, a sensing profile, or a data emitting profile, and, preferably, wherein the at least one profile comprises a lighting profile which defines one or more lighting settings of the luminaire in function of time, said one or more settings including: a light intensity, a lighting pattern, a light spectrum, or a dimming level.

4. The method according to claim 1, further comprising:
based on the retrieved position, selecting a pathway type from the infrastructure database said infrastructure database further storing a plurality of different pathway types;
based on the selected pathway type, determining, for each of the one more luminaires, one or more predetermined lighting rules defining one or more lighting requirements in function of the pathway type; and
determining the at least one profile further based on the determined one or more predetermined lighting rules.

5. The method according to claim 1, further comprising the steps of:
retrieving traffic data from at least one traffic database; and
determining the at least one profile further based on the retrieved traffic data.

6. The method according to claim 1, further comprising the steps of:
retrieving weather data,
wherein retrieving weather data comprises retrieving weather data from at least one weather database and/or retrieving weather data sensed by a sensor associated with one or more luminaires of the plurality of luminaires; and
determining the at least one profile further based on the retrieved weather data.

7. The method according to claim 1, wherein the plurality of infrastructure uses and/or features includes uses and/or features data in function of time, and/or wherein the plurality of infrastructure uses and/or features are related to uses and/or features added to a pathway or neighboring the pathway.

8. The method of claim 1, further comprising retrieving environmental sensor data from one or more environmental sensors associated with one or more luminaires of the plurality of luminaires, wherein the step of determining the at least one profile is further based on the environmental sensor data.

9. The method according to claim 1, wherein the method is performed upon commissioning a new luminaire in the luminaire network, preferably performed by a segment controller of the luminaire network.

10. A computer program comprising computer-executable instructions to perform the method, when the program is run on a computer, of claim 1.

11. A control system for a luminaire network comprising a plurality of luminaires, each luminaire of said plurality of luminaires being configured to operate in accordance with at least one profile which defines one or more settings of the luminaire in function of time, said control system being configured for:
retrieving a position of one or more luminaires of the plurality of luminaires from a luminaire network database, said position being preferably defined by geo-localization coordinates, more preferably by GPS coordinates;
based on the retrieved position, selecting an infrastructure use and/or feature from an infrastructure database, said infrastructure database storing a plurality of different infrastructure uses and/or features,
wherein the infrastructure comprises: a public building, a public area, a pathway element, or a pathway zone;
determining, for each of the one or more luminaires, at least one profile based on the selected infrastructure use and/or feature, said determining being performed preferably periodically, more preferably once a day, even more preferably once an hour, most preferably once a minute; and
optionally, storing, for each of the one or more luminaires, the at least one profile in a memory of the corresponding luminaire.

12. The control system according to claim 11, wherein the plurality of infrastructure uses and/or features comprises: a parking lot, a pedestrian crossing, a cycling crossing, a speed bump, a school, a hospital, a junction, a roundabout, a public building, a low speed area, a transportation stop, a conflict area, a residential use, a night life use, or an animal passage use.

13. The control system according to claim 11, wherein the at least one profile comprises: a lighting profile, a sensing profile, or a data emitting profile, and, preferably, wherein the at least one profile comprises a lighting profile which defines one or more lighting settings of the luminaire in function of time, said one or more settings including: a light intensity, a lighting pattern, a light spectrum, or a dimming level.

14. The control system according to claim 11, wherein the control system is further configured for:
based on the retrieved position, selecting a pathway type from the infrastructure database said infrastructure database further storing a plurality of different pathway types;
based on the selected pathway type, determining, for each of the one more luminaires, one or more predetermined lighting rules defining one or more lighting requirements in function of the pathway type; and
determining the at least one profile further based on the determined one or more predetermined lighting rules.

15. The control system according to claim 11, wherein the control system is further configured for:
retrieving traffic data from at least one traffic database; and
determining the at least one profile further based on the retrieved traffic data.

16. The control system according to claim 11, wherein the control system is further configured for:
retrieving weather data,
wherein retrieving weather data comprises retrieving weather data from at least one weather database and/or retrieving weather data sensed by a sensor associated with one or more luminaires of the plurality of luminaires; and determining the at least one profile further based on the retrieved weather data.

17. The control system according to claim 11, wherein the plurality of infrastructure uses and/or features includes uses and/or features data in function of time, and/or wherein the plurality of infrastructure uses and/or features are related to uses and/or features added to a pathway or neighboring the pathway.

18. The control system according to claim 11, wherein the control system is further configured for retrieving environmental sensor data from one or more environmental sensors associated with one or more luminaires of the plurality of luminaires, and wherein the step of determining is further based on the environmental sensor data.

19. A luminaire network comprising a plurality of luminaires and the control system according to claim 11 for managing said plurality of luminaires.

20. A method of performing management in a luminaire network comprising a plurality of luminaires and a control system, each luminaire of said plurality of luminaires being configured to operate in accordance with at least one profile which defines one or more settings of the luminaire in function of time, said method comprising performing by said control system the steps of:

retrieving image data associated with a luminaire of the plurality of luminaires, said image data picturing at least one infrastructure neighboring the luminaire, wherein the at least one infrastructure comprises: a public building, a public area, a pathway element, or a pathway zone, preferably, wherein the retrieving of image data comprises capturing, by an image capturing device of the luminaire, an image picturing the at least one infrastructure neighboring the luminaire;

based on the retrieved image data, selecting at least one infrastructure use and/or feature from an infrastructure database, said infrastructure database storing a plurality of different infrastructure uses and/or features; and determining, for the luminaire, at least one profile based on the selected at least one infrastructure use and/or feature.

21. A method of performing management in a luminaire network comprising a plurality of luminaires and a control system, said method comprising performing by said control system the steps of:

associating to each luminaire of the plurality of luminaire at least one infrastructure use and/or feature from an infrastructure database, said infrastructure database storing a plurality of different infrastructure uses and/or features, wherein the plurality of infrastructure uses and/or features comprises: a parking lot, a pedestrian crossing, a cycling crossing, a speed bump, a school, a hospital, a junction, a roundabout, a public building, a low speed area, a transportation stop, a conflict area, a residential use, a night life use, or an animal passage use, and wherein each luminaire of said plurality of luminaires is configured to operate in accordance with at least one profile which defines one or more settings of the luminaire in function of time; and performing one or more actions based on the associated at least one infrastructure use and/or feature, wherein the performing of the one or more actions comprises at least one of the following:

transmitting, by the control system, a profile common to a plurality of luminaires being associated with a similar infrastructure use and/or feature to said plurality of luminaires; and performing a same action for a plurality of luminaires being associated with a similar infrastructure use and/or feature.

* * * * *